United States Patent [19]

Ratherham

[11] Patent Number: 5,293,774
[45] Date of Patent: Mar. 15, 1994

[54] SHAFT BREAKAGE DETECTION APPARATUS

[75] Inventor: Edward M. Ratherham, Redditch, England

[73] Assignee: Lucas Industries Public Limited Company, England

[21] Appl. No.: 881,839

[22] Filed: May 12, 1992

[30] Foreign Application Priority Data

Jun. 4, 1991 [GB] United Kingdom ............... 9111906.5

[51] Int. Cl.$^5$ .................... F02G 3/00; G01M 15/00
[52] U.S. Cl. ................................. 73/116; 60/39.091; 377/19
[58] Field of Search ............. 73/116, 118.1, 865.8; 377/16, 19; 417/405, 408, 409; 60/39.091

[56] References Cited

U.S. PATENT DOCUMENTS

| | | | |
|---|---|---|---|
| 2,625,789 | 1/1953 | Starkey | 60/39.091 |
| 3,159,166 | 12/1964 | Luedemann et al. | 60/39.091 |
| 3,578,871 | 2/1968 | Sakamoto | 60/39.091 |
| 3,808,407 | 4/1974 | Ratz | 377/19 |
| 4,057,714 | 11/1977 | Fork et al. | 73/116 |
| 4,158,172 | 6/1979 | Boyen et al. | 377/19 |
| 4,434,470 | 2/1984 | Thomas et al. | 377/19 |
| 4,485,452 | 11/1984 | Cording et al. | 377/19 |
| 4,651,563 | 3/1987 | Zweifel | 73/116 |
| 4,995,257 | 2/1991 | Leon | 73/116 |
| 5,041,979 | 8/1991 | Hirka et al. | 73/116 |

Primary Examiner—Hezron E. Williams
Assistant Examiner—George Dombroske
Attorney, Agent, or Firm—Andrus, Sceales, Starke & Sawall

[57] ABSTRACT

Sensors are provided for monitoring the speeds of a turbine and a compressor interconnected by a shaft. Signals from the sensors are used to control the direction of counting of a counter. If the shaft is intact, the counter repeatedly counts up from and returns to zero. If the shaft breaks, the counter counts upwardly and a signal is given when the count in the counter exceeds a threshold value.

17 Claims, 5 Drawing Sheets

| T | C | U | D | E |
|---|---|---|---|---|
| 0 | 0 | 0 | 0 | 0 |
| 1 | 0 | 1 | 0 | 1 |
| 0 | 1 | 0 | 1 | 1 |
| 1 | 1 | 0 | 0 | 0 |

SHAFT BREAKAGE DETECTION APPARATUS

This invention relates to an apparatus for detecting breakage of a shaft, for example a turbine shaft in a gas turbine engine.

If a gas turbine engine shaft breaks, the engine must be shut down as quickly as possible. In the event of such breakage, the speed of a turbine on one end of the shaft will very rapidly exceed that of a compressor at its other end, and breakage may therefore be detected by sensing a difference between the rotational positions of the shafts ends.

It is an object of the invention to provide an overspeed detection system in which rapidity of response is improved.

Shaft speed detection devices on gas turbine engines are prone to respond to spurious transient electromagnetic pulses which originate externally, for example for lightning. It is desirable to provide an overspeed detection apparatus which will not indicate shaft breakage in response to these transients, but which will ensure that genuine overspeed signals are not suppressed.

Apparatus in accordance with various broad aspects of the invention and preferred embodiments thereof are defined in the appended claims.

An embodiment of the invention will now be described by way of example only and with reference to the accompanying drawings, in which.

Figure 1:
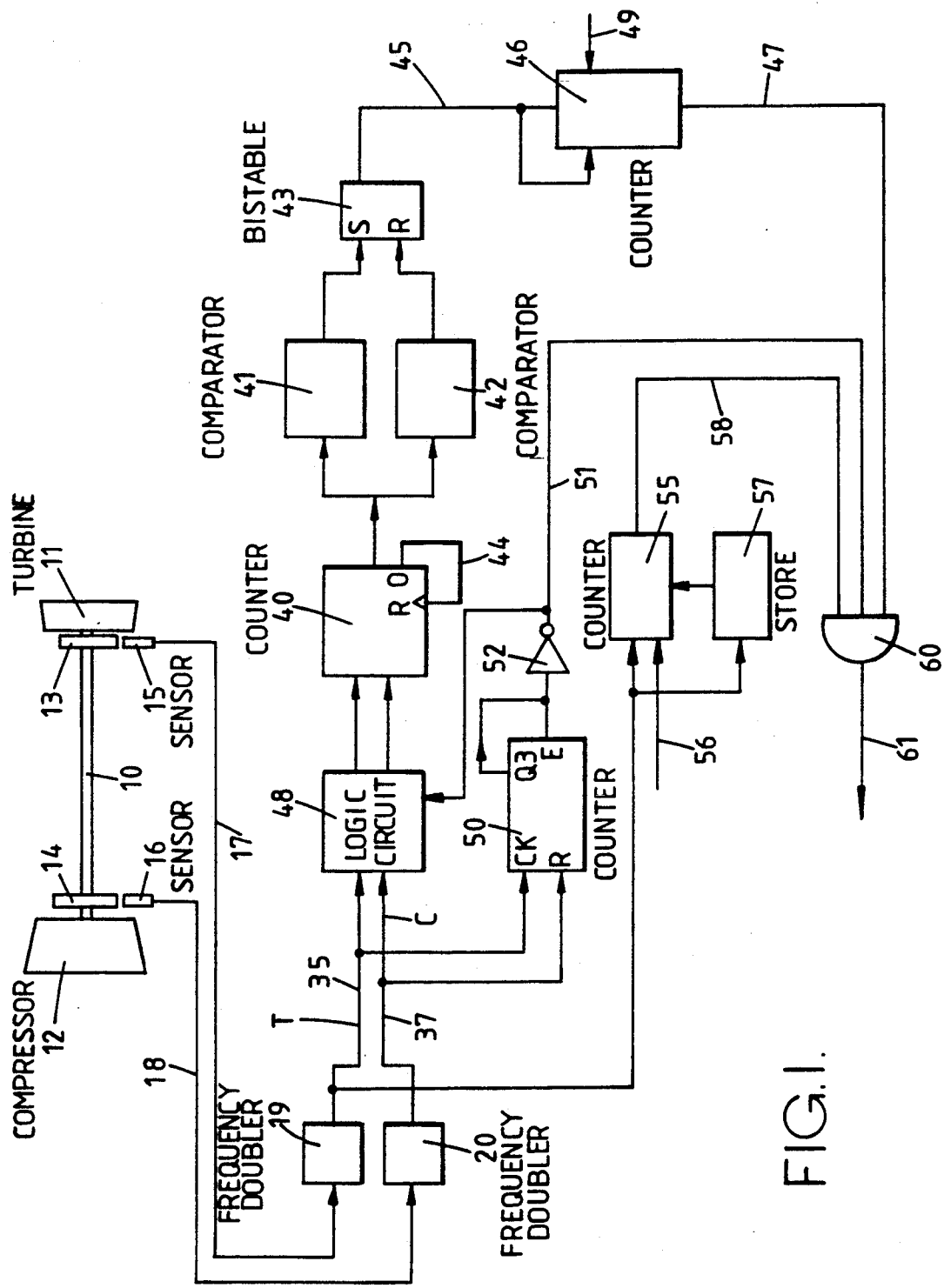
FIG. 1 shows, diagrammatically, a gas turbine engine shaft and a speed detection apparatus constituting an embodiment of the present invention.

As shown in FIG. 1 a shaft 10 for a gas turbine engine carries a turbine 11 and a compressor 12. Adjacent the turbine 11 and compressor 12 are respective toothed wheels 13, 14 which electromagnetically induce pulses in sensors 15, 16 as the shaft rotates. The sensors 15, 16 emit a pulse every 6 degrees of rotation of their adjacent wheels. The pulses are applied on lines 17, 18 to respective identical frequency doubling circuits 19, 20, one of which is shown in detail in FIG. 2.

Figures 2, 4:
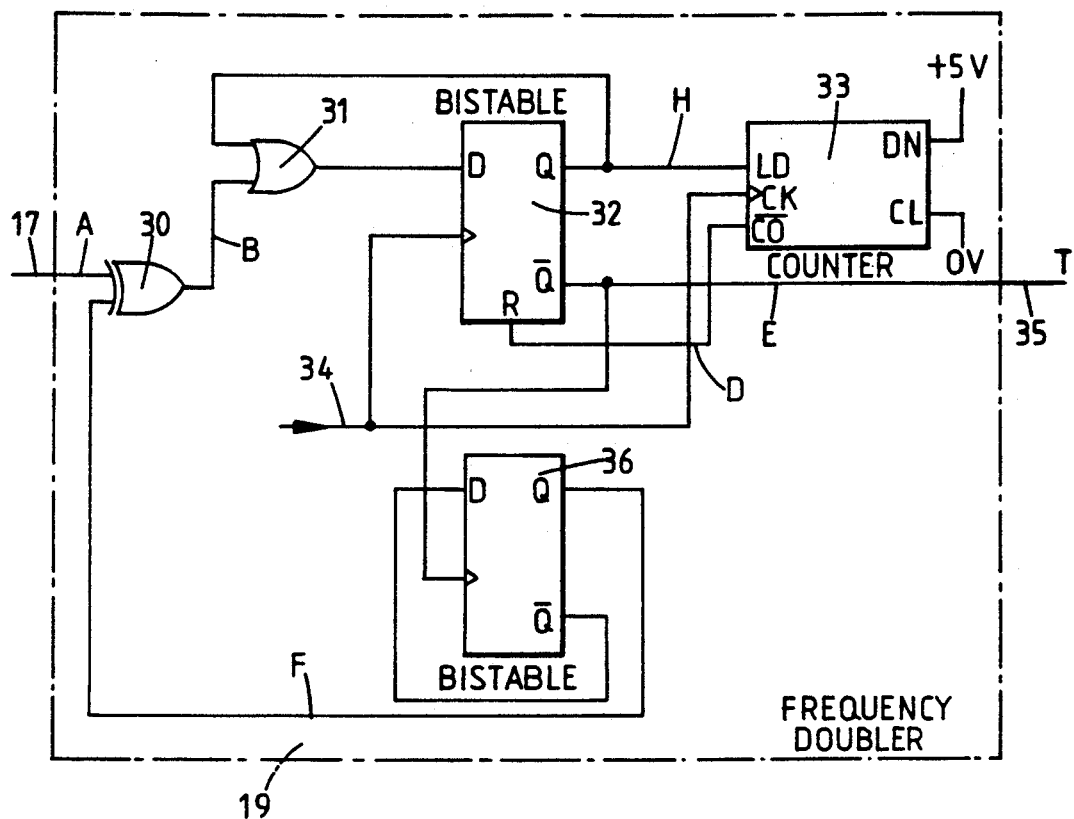
FIG. 2 shows details of a frequency doubling circuit forming part of FIG. 1.
FIG. 4 shows a truth table for a logic circuit forming part of FIG. 1.

As shown in FIG. 2, the signal on line 17 is applied to one input of an EXCLUSIVE OR gate 30 whose output is connected to one input of an OR gate 31. The output of the gate 31 is connected to the D terminal of a D type bistable 32 whose Q terminal is connected to the load terminal LD of an 8-bit counter 33 and to the second input of the gate 31. The clock terminal CK of the counter 33 is connected by a line 34 to a 600 kHz supply and the carry terminal $\overline{CO}$ is connected to the reset terminal R of the bistable 32. The $\overline{Q}$ terminal of the bistable 32 is connected to an output line 35 and to the clock terminal of a further D type bistable 36. The D and $\overline{Q}$ terminals of bistable 36 are interconnected and its Q terminal is connected to a second input of the EXCLUSIVE OR gate 30.

Figure 3:
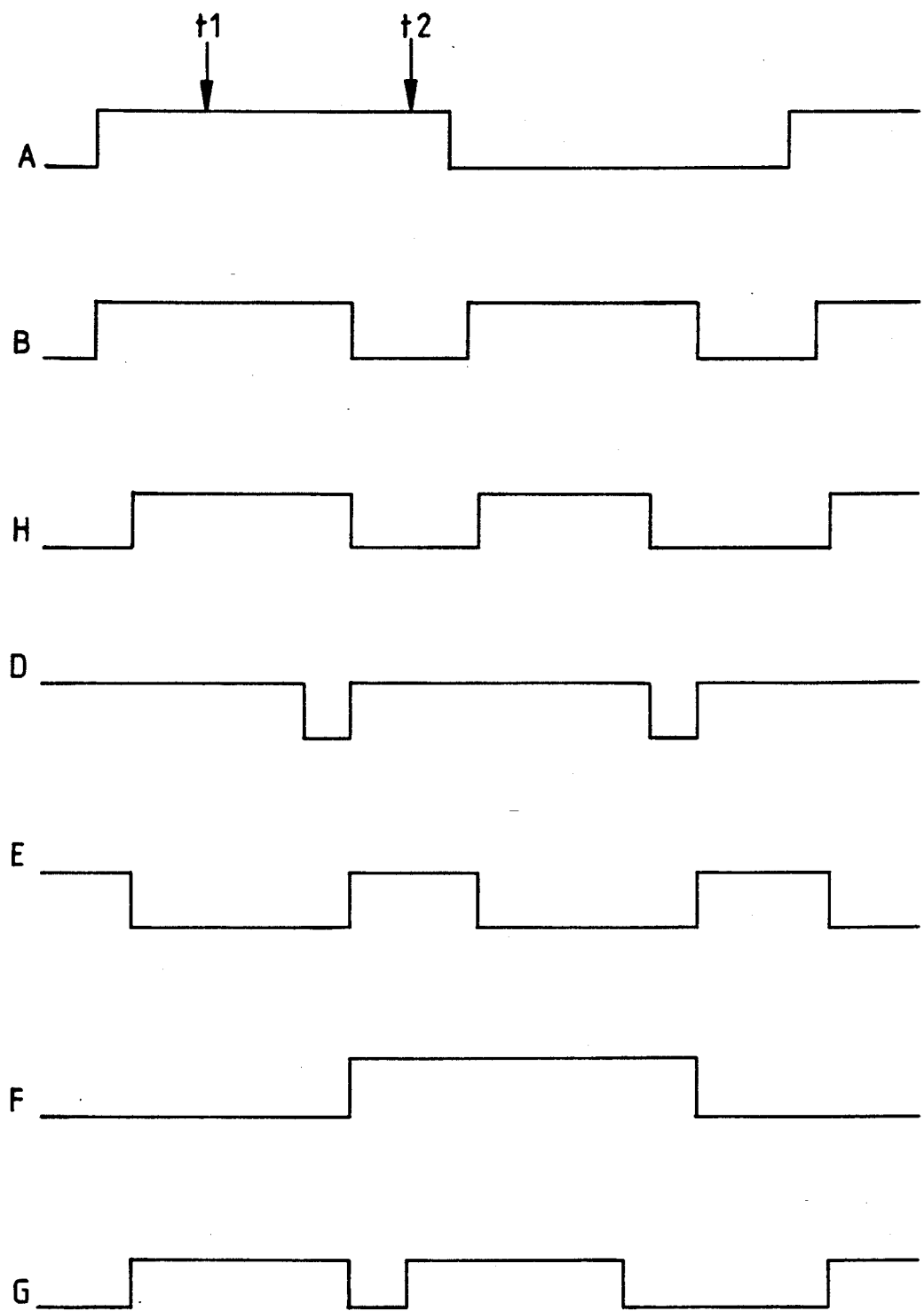
FIG. 3 shows the signal states at indicated locations in FIG. 2.

Assuming that the Q output of bistable 36 is initially low, a high level signal at A (see also FIG. 3) will result in a high level output at B, and from the gate 31. The next clock pulse on line 34 sets the signal at H high, causing the counter 33 to respond to the clock pulses on line 34. At a predetermined count value CO the signal at D goes low, and the bistable 32 is reset by the next clock pulse on line 34. When the bistable 32 is reset, the signal at E goes high and clocks the bistable 36 as well as appearing on the output line 35. The bistable 36 changes stage and the signal at F becomes high, turning off the output of the gate 30, as indicated at B. The cycle restarts when the signal at A goes low, and continues for a further period determined by the predetermined level set by the counter 33. The circuit 19 thus provides on the line 35 a train of pulses T whose frequency is twice that of the pulses on line 17 and whose duration is set by the counter 33. In the present example the duration of each of the pulses T is of the order of 74.44 microsecs. The circuit 20 (FIG. 1) operates similarly to provide on a line 37 a train of pulses C whose frequency is twice that of the pulses on line 18. The duration of each pulse C is however set to be slightly longer than the pulses T, for reasons to be explained later.

Figure 5:
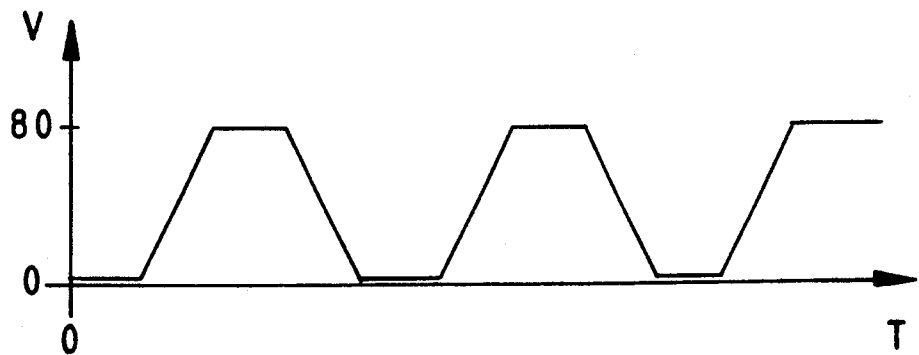
FIG. 5 shows count levels occurring in the apparatus during normal operation.

The pulses T and C are applied to an up-down counter 40 (FIG. 1) by way of a logic circuit 48 whose truth table is shown in FIG. 4. FIG. 4 indicates, for states of the pulses T and C, whether the counter 40 is to count up U or down D, and is enabled E or otherwise. It will be seen that the counter 40 counts up in response to T pulses and down in response to C pulses. In normal operation and ignoring torsional oscillation of the shaft 10 the values in the counter 40 will be as indicated in FIG. 5. The slightly longer duration of the pulses C ensures that in normal operation there will be no tendency for the maximum value in the counter to creep upwards over a plurality of counting cycles. The counter 40 is prevented, in a manner to be described, from registering a negative count, and thus resets to zero after each cycle.

Figure 6:
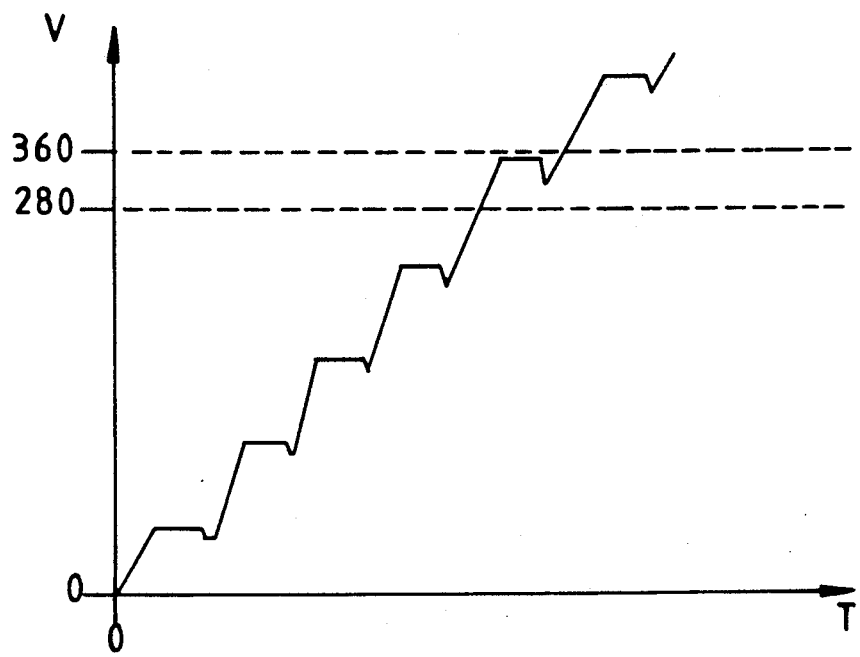
FIG. 6 shows count levels occurring during shaft breakage.

The value in the counter 40 is supplied to maximum and minimum value comparators 41, 42 (FIG. 1), the comparator 41 being set to provide an output signal to the S terminal of a bistable 43 when the value in the counter 40 exceeds 360, and the comparator 42 to provide an output signal to the R terminal of the bistable 43 when the count value is less than 280. The comparator arrangement thus has hysteresis and thereby takes into account fluctuations arising from torsional vibrations of the shaft 10. The counter 40 is reset by a signal on a line 44 when the counter value falls to zero. In normal operation the slightly longer pulses C will thereby cause the counter 40 to be reset after each cycle, as indicated above. In the event of breakage of the shaft 10 the value in the counter 40 will progressively rise, as shown in FIG. 6, and when that value exceeds 360 the comparator 41 causes the bistable 43 to provide a high level signal on a line 45.

The signal on line 45 is applied to a counter 46 which is responsive to a clock signal on a line 49. The arrangement is such that, in response to a high level signal on line 45, the counter 46 provides a high level signal on a line 47 after 500 microseconds. A low level signal on line 45 resets the counter 46. A high level signal thus exists on line 47 only if the value in counter 40 exceeds 360 for more than 500 microseconds. Transient excursions in excess of 360 are thus excluded.

Figure 7A:
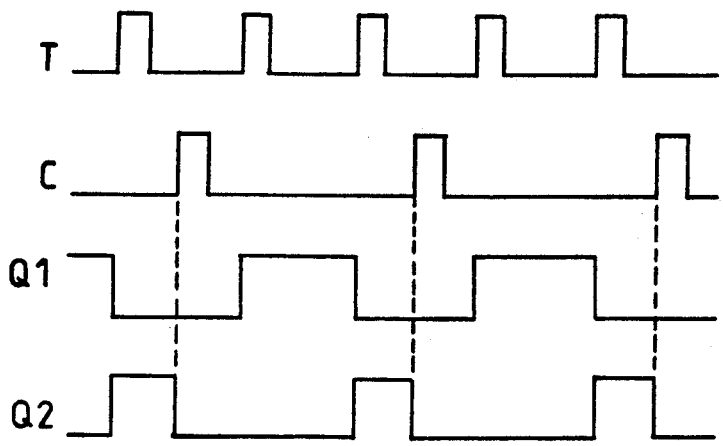
FIG. 7 shows signal states in a detection device forming part of FIG. 1.
Figure 7B:
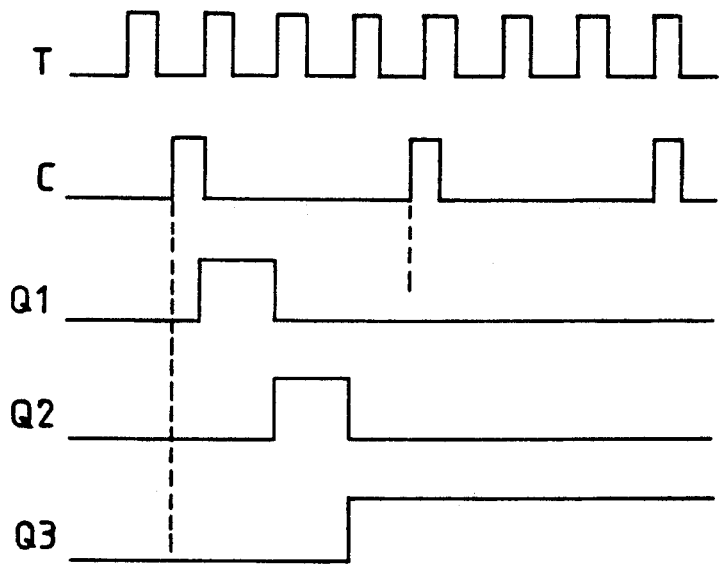

As shown in FIG. 1, the pulse trains T and C are also applied to a Johnson counter 50 to whose clock and reset terminals the lines 35, 37 are respectively connected. The counter 50 thus increments its output value at each pulse T until reset by a pulse C. The Q3 output of the counter 50 is connected to its clock enable terminal. It is assumed that in normal operation there will never be more than two turbine pulses T between adjacent compressor pulses C. In those circumstances the counter 50 will count up to two before being reset by the C pulse, as indicated in FIG. 7A. Should more than two pulses occur in the value, the counter 50 will reach three and, as shown in FIG. 7B, the Q3 output will be latched and provide a high level signal which indicates absence of signals from the detector 16 associated with the compressor 12. The Q3 output signal is supplied through an inverter 52 to a line 51, so that a high level signal on line 51 indicates a satisfactory state of the signals C. The signal on line 51 is also applied to the logic circuit 48 to validate the output signals therefrom to the counter 40.

The pulse train T on the line 35 is applied to a further counter 55 which is supplied with clock signals on a line 56 and is responsive to a preset value in a store 57, that value corresponding to a speed of 1000 RPM, so that the counter 55 provides a high level output signal on a line 58 only when the interval between consecutive pulses T corresponds to a turbine speed greater than 1000 RPM.

The signals on lines 47, 51 and 58 are applied to the inputs of an AND gate 60 which provides an output signal on a line 61, indicating shaft breakage only when the pulse train C is satisfactory, the turbine speed is over 1000 RPM and an unacceptable excess of turbine speed over compressor speed has persisted for more than 500 microseconds.

Referring back to FIG. 3, if a spurious pulse is induced at time t1 in either of lines 17, 18 (FIG. 1), this will have no effect since the bistable 32 (FIG. 2) is latched for the duration of the count CO by counter 33. If a spurious pulse is induced at time t2, this will, as shown at G, initiate an output pulse on the corresponding one of the lines 35 or 37, but the next output pulse will not be initiated until the next clock pulse following a subsequent positive-going edge of the input signal A.

I claim:

1. An apparatus for detecting breakage of a rotary shaft, comprising first and second sensors for producing first and second signals whose frequencies are dependent on first and second speeds of first and second regions, respectively, of the shaft, an up-down counter, control means for causing said counter to count in opposite directions in response to the first and second signals, respectively, means for biasing said counter towards zero, and signaling means for signaling if the count in said counter passes a first predetermined threshold.

2. An apparatus as claimed in claim 1, in which said control means is arranged to cause said counter to count up and down in response to the first and second signals, respectively.

3. An apparatus as claimed in claim 1, in which said first and second sensors are arranged to produce the first and second signals in the form of respective pulse trains.

4. An apparatus as claimed in claim 1, further comprising first and second control pulse forming means for providing first and second control pulses of first and second predetermined durations, respectively, in response to the first and second signals, respectively.

5. An apparatus as claimed in claim 4, further comprising frequency doubling means for doubling frequencies of the first and second signals and in which the frequency doubled signals are supplied to said first and second control pulse forming means, respectively.

6. An apparatus as claimed in claim 4, in which said control means is arranged to cause said counter to count up only when the first control pulse is present and the second control pulse is absent.

7. An apparatus as claimed in claim 4, in which said control means is arranged to cause said counter to count down only when the second control pulse is present and the first control pulse is absent.

8. An apparatus as claimed in claim 4, further comprising gating means arranged to inhibit said signalling means when at least three first control pulses occur in a time period between consecutive second control pulses.

9. An apparatus as claimed in claim 1, in which said counter is prevented from counting down below zero.

10. An apparatus as claimed in claim 1, in which said signalling means is arranged to signal if the count in said counter exceeds the first predetermined threshold and to continue to signal until the count in said counter falls below a second predetermined threshold.

11. An apparatus as claimed in claim 10, in which the second predetermined threshold is less than the first predetermined threshold.

12. An apparatus as claimed in claim 1, in which said signalling means is arranged to signal only if the count in said counter exceeds the first predetermined threshold for longer than a first time period.

13. An apparatus as claimed in claim 1 for monitoring a turbine shaft in a gas turbine engine comprising a turbine and a compressor attached to the shaft, in which said first and second sensors are responsive to the speeds of the turbine and the compressor, respectively.

14. An apparatus as claimed in claim 13, further comprising inhibiting means for inhibiting said signalling means when a speed of the turbine is less than a predetermined speed.

15. An apparatus as claimed in claim 1, further comprising means for resetting said counter each time a down count equals a preceding up count.

16. An apparatus for detecting breakage of a turbine shaft in a gas turbine engine, comprising two detection devices for producing first and second pulse trains whose frequencies are responsive to speeds of a turbine and a compressor, respectively, on the shaft, an up-down counter, means for causing said counter to count up and down in response to pulses from the first and second trains, respectively, means for providing an indicating signal if the value in said counter exceeds a predetermined level, means for causing a magnitude of a count in response to the pulses in the second train to exceed that in response to the pulses in the first train, and means for resetting said counter each time a down count thereby equals a preceding up count.

17. An apparatus for detecting breakage of a rotary shaft, comprising first and second sensors for producing first and second signals whose frequencies are dependent on first and second speeds of first and second regions, respectively, of the shaft, an up-down counter, first and second control pulse forming means for providing first and second control pulses of first and second predetermined durations, respectively, in response to the first and second signals, respectively, the second control pulse being longer than the first control pulse, control means causing said counter to count in opposite directions in response to the first and second control pulses, respectively, and signaling means for signaling if the count in said counter passes a first predetermined threshold.

* * * * *